US008636257B2

(12) United States Patent
Tsou et al.

(10) Patent No.: US 8,636,257 B2
(45) Date of Patent: Jan. 28, 2014

(54) SUPPORT DEVICE

(75) Inventors: Meng-Yu Tsou, New Taipei (TW);
Cong-Cong Wang, Shenzhen (CN);
Jing-Hui You, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 129 days.

(21) Appl. No.: 13/284,985

(22) Filed: Oct. 31, 2011

(65) Prior Publication Data
US 2012/0312946 A1 Dec. 13, 2012

(30) Foreign Application Priority Data

Jun. 13, 2011 (CN) .............................. 201110157196

(51) Int. Cl.
*A47F 5/00* (2006.01)

(52) U.S. Cl.
USPC ................... 248/288.31; 248/121; 248/176.3; 248/917; 248/919

(58) Field of Classification Search
USPC ................ 248/121, 122.1, 133, 176.3, 274.1, 248/346.72, 917, 918, 919, 920, 921, 922, 248/923, 288.31, 292.13
See application file for complete search history.

(56) References Cited

U.S. PATENT DOCUMENTS

| | | | | | |
|---|---|---|---|---|---|
| 5,673,628 | A | * | 10/1997 | Boos | 108/44 |
| 5,687,945 | A | * | 11/1997 | Lee | 248/442.2 |
| 6,042,064 | A | * | 3/2000 | Hong | 248/118.5 |
| 6,464,185 | B1 | * | 10/2002 | Minelli et al. | 248/183.1 |
| 6,796,536 | B1 | * | 9/2004 | Sevier, IV | 248/121 |
| 7,093,313 | B2 | * | 8/2006 | DeBraal et al. | 5/622 |
| 7,316,377 | B2 | * | 1/2008 | Smed | 248/276.1 |
| 7,338,022 | B2 | * | 3/2008 | Hung | 248/278.1 |
| 7,472,458 | B2 | * | 1/2009 | Oddsen, Jr. | 16/255 |
| 7,690,605 | B2 | * | 4/2010 | Lee et al. | 248/133 |
| 8,066,241 | B2 | * | 11/2011 | Yu et al. | 248/286.1 |
| 8,104,728 | B2 | * | 1/2012 | Chen | 248/286.1 |
| 2004/0251388 | A1 | * | 12/2004 | Williams | 248/274.1 |
| 2005/0006542 | A1 | * | 1/2005 | Henning et al. | 248/274.1 |
| 2005/0121578 | A1 | * | 6/2005 | Asamarai et al. | 248/284.1 |
| 2006/0261227 | A1 | * | 11/2006 | Petrick et al. | 248/276.1 |
| 2007/0034753 | A1 | * | 2/2007 | Lee | 248/121 |
| 2007/0040089 | A1 | * | 2/2007 | Shiff | 248/448 |
| 2007/0120024 | A1 | * | 5/2007 | Oddsen et al. | 248/122.1 |
| 2007/0272809 | A1 | * | 11/2007 | Jang | 248/133 |
| 2008/0029663 | A1 | * | 2/2008 | Derry et al. | 248/178.1 |
| 2008/0223996 | A1 | * | 9/2008 | Joanisse et al. | 248/123.11 |
| 2010/0096518 | A1 | * | 4/2010 | Wang et al. | 248/125.7 |
| 2010/0108828 | A1 | * | 5/2010 | Yu et al. | 248/123.11 |
| 2010/0198052 | A1 | * | 8/2010 | Jenkins et al. | 600/417 |
| 2011/0095143 | A1 | * | 4/2011 | Wang et al. | 248/122.1 |
| 2012/0175474 | A1 | * | 7/2012 | Barnard et al. | 248/122.1 |
| 2012/0205503 | A1 | * | 8/2012 | Kobal | 248/121 |
| 2012/0273630 | A1 | * | 11/2012 | Gillespie-Brown et al. | 248/122.1 |

* cited by examiner

*Primary Examiner* — Terrell McKinnon
*Assistant Examiner* — Monica Millner
(74) *Attorney, Agent, or Firm* — Altis Law Group, Inc.

(57) ABSTRACT

A support and cushioning device for supporting and holding an electronic device includes a first supporting assembly, a fixed bracket, an adjusting board, and a plurality of elastic members. The adjusting board is mounted to the distal end of the first support assembly. The fixed bracket is elastically mounted to the adjusting board by means of a plurality of elastic members. The fixed bracket includes a base body and a plurality of holding arms extending out from a periphery of the base body. The plurality of holding arms and the base body cooperatively define a holding space for holding an electronic device.

9 Claims, 4 Drawing Sheets

SUPPORT DEVICE

BACKGROUND

1. Technical Field

The present disclosure generally relates to support devices, and particularly to a support device for supporting a portable electronic device.

2. Description of Related Art

Portable electronic devices such as panel computers, electronic navigation devices, and mobile phones are all equipped with big screens and are widely used. When the consumers use the portable electronic device to watch programs in a car, the portable electronic device may shake and bounce, which is unsatisfactory for the consumers.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
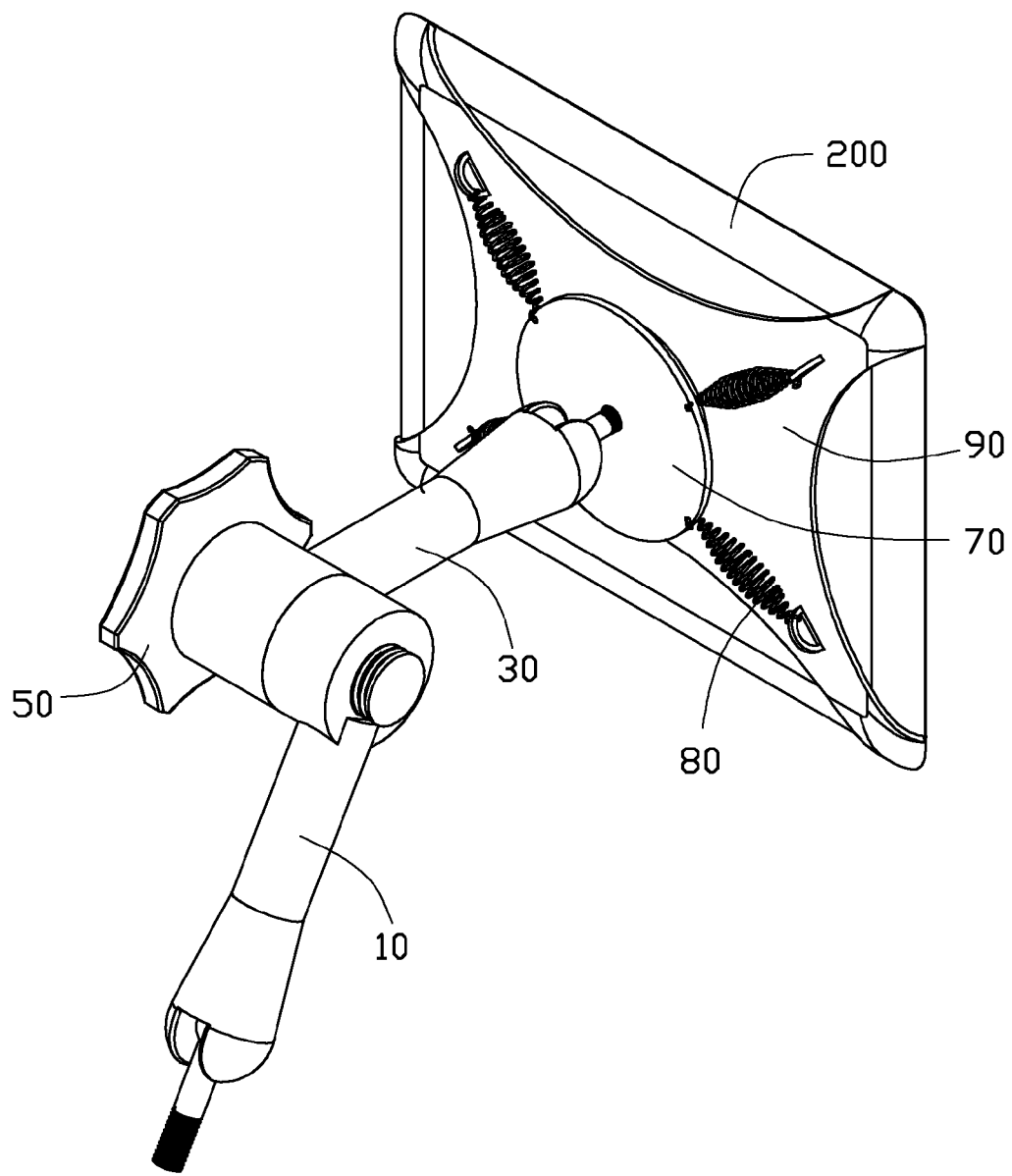
FIG. 1 shows an isometric view of an embodiment of an assembled support device being used, wherein, the electronic device is supported by the support device.
Figure 2:
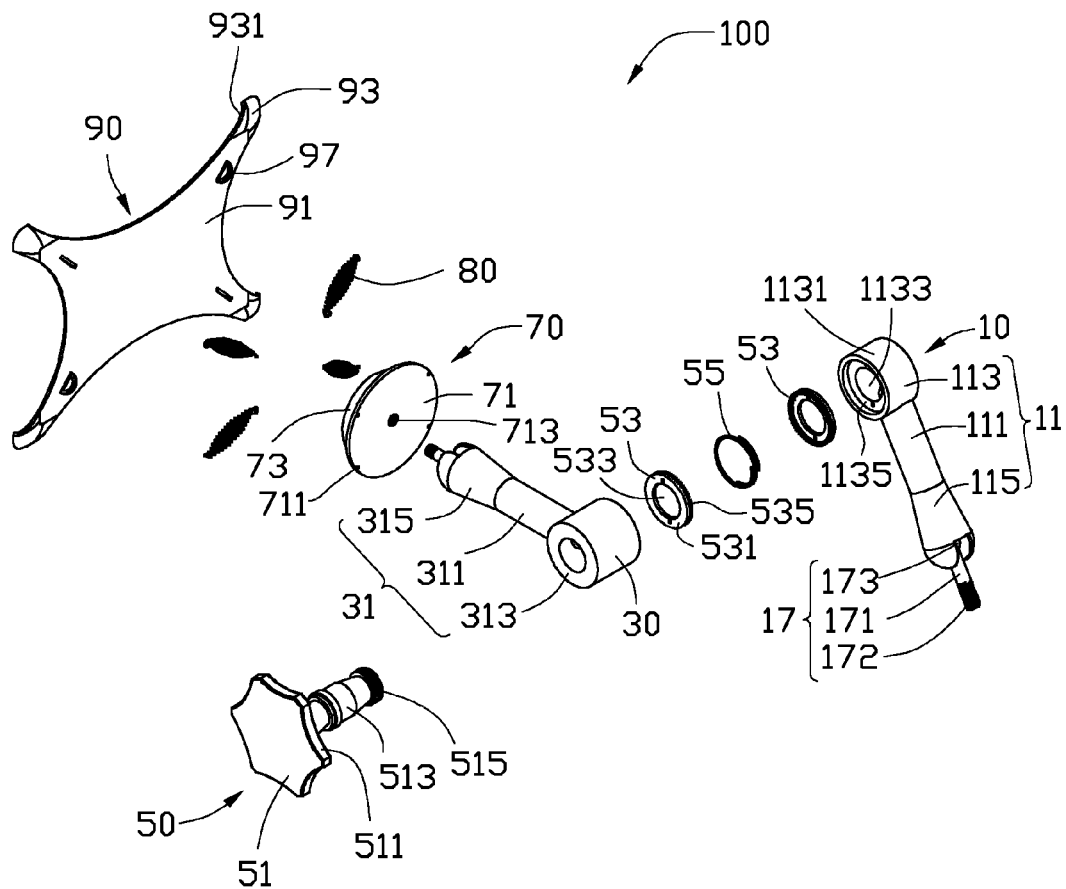
FIG. 2 shows an exploded, isometric view of the support device of FIG. 1.

Referring to FIGS. 1 and 2, an embodiment of a support device 100 is used for fixing and supporting an electronic device 200 equipped with a screen, such as a panel computer, a portable electronic navigation device, a mobile phone, or the like. The support device 100 includes a first support assembly 10, a second support assembly 30, an angle adjusting assembly 50, an adjusting board 70, a plurality of elastic members 80 and a fixed bracket 90. The first support assembly 10 is rotatably and adjustably assembled with the second support assembly 30 by means of the angle adjusting assembly 50. The adjusting board 70 is mounted to the distal end of the second support assembly 30 and is elastically connected to the fixed bracket 90 by means of the plurality of elastic members 80. The fixed bracket 90 is for holding the electronic device 200.

Figure 3:
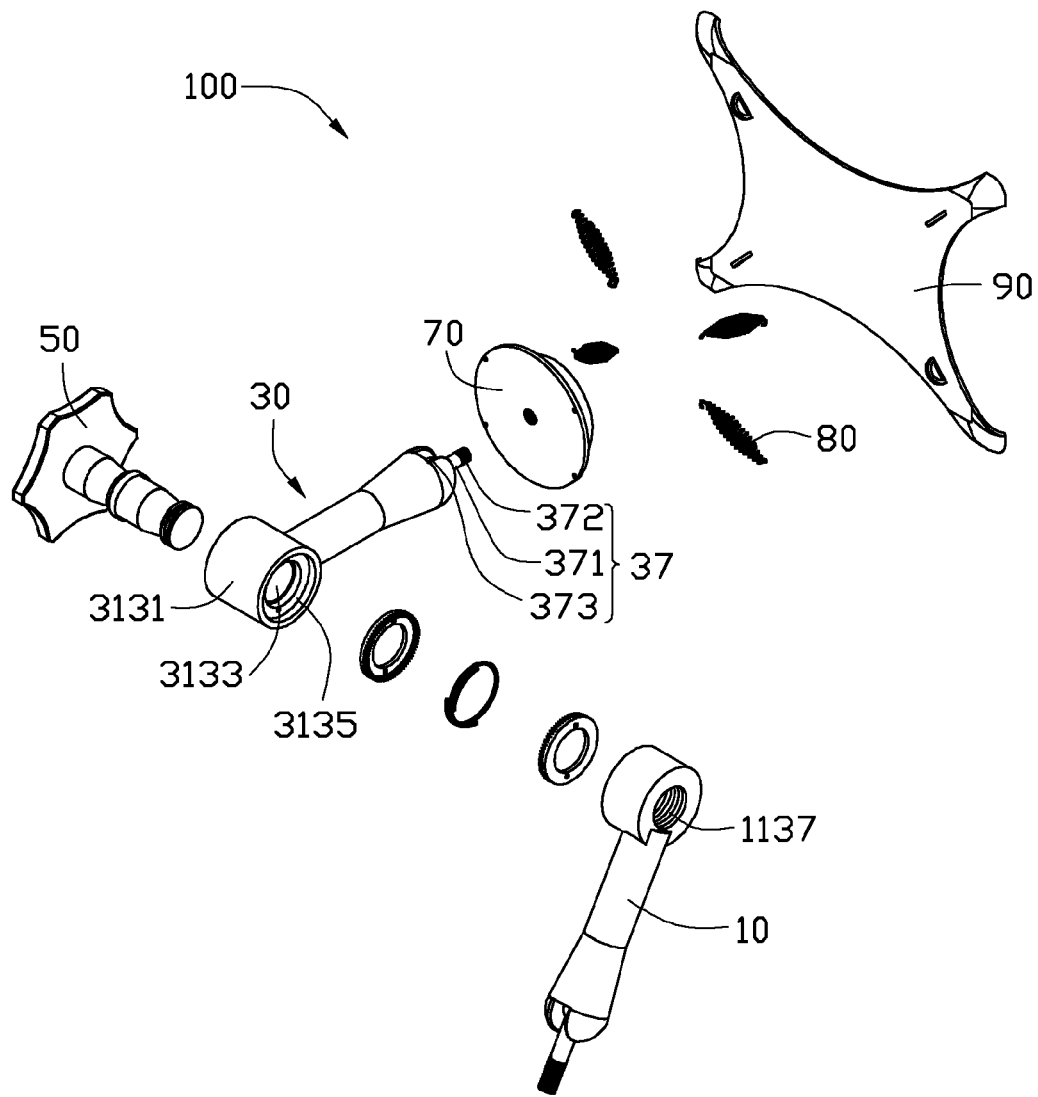
FIG. 3 is similar to FIG. 2, but viewed from another aspect.
Figure 4:
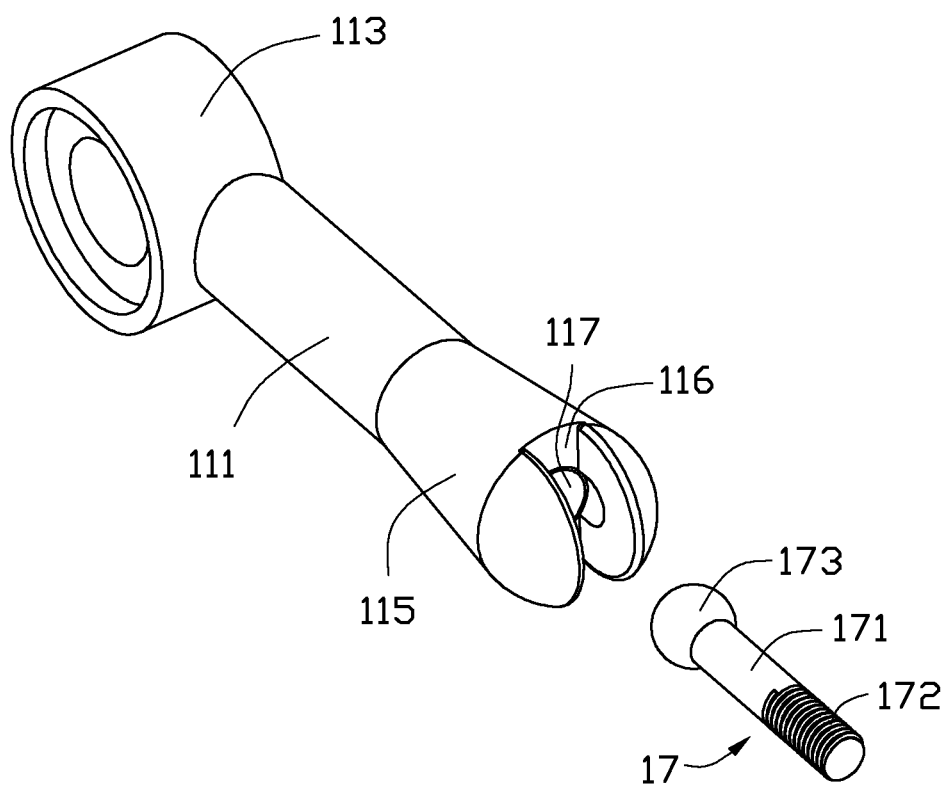
FIG. 4 shows an exploded, isometric view of a first support assembly of the support device of FIG. 1.

Referring to FIGS. 3 and 4, the first support assembly 10 includes a support rod 11 and a connecting rod 17 rotatably connected to the base end of the support rod 11. In the illustrated embodiment, the support rod 11 includes a rod body 111, a sleeve portion 113 positioned at a first end of the rod body 111, and a hinge portion 115 positioned at the other end of the rod body 111. The rod body 111 is a substantially cylindrical rod. The sleeve portion 113 is a substantially hollow cylindrical body integrally formed at one end of the rod body 111 and perpendicular to the rod body 111. The sleeve portion 113 includes a sleeve pipe 1131 and defines a sleeving hole 1133 through the sleeve pipe 1131 in a direction perpendicular to the longitudinal axis of the rod body 111. One end of the sleeve portion 113 defines a mounting hole 1135 having a diameter larger than that of the sleeving hole 1133 of the sleeve portion 113 and concentric with the sleeving hole 1133. The second end of the sleeve portion 113 defines an inner threaded portion 1137 within the sleeving hole 1133 of the sleeve portion 113.

The hinge portion 115 is substantially cone shaped and integrally formed at the base end of the rod body 111 opposite to the sleeve portion 113. The diameter of the hinged portion 115 decreases towards the rod body 111. The base end of the hinged portion 115 away from the sleeve portion 113 develops into a round shape. A mounting groove 116 across the round shape is recessed in the base end of the hinged portion 115. A spherical pivotal recession 117 is recessed into the bottom of the mounting groove 116.

The connecting rod 17 includes a cylindrical rod portion 171 and a pivotal ball 173 formed on one end of the rod portion 171. The pivotal ball 173 of the connecting rod 17 is rotatably connected into the spherical pivotal recession 117 of the hinge portion 115 of the support rod 11. An outer threaded portion 172 is formed at the opposite end of the rod portion 171 of the connecting rod 17.

The second support assembly 30 has substantially the same structure as that of the first support assembly 10. The second support assembly 30 includes a support rod 31 and a connecting rod 37 rotatably connected to the device end of the support rod 31. In the illustrated embodiment, the support rod 31 includes a rod body 311, a sleeve portion 313 disposed at one end of the rod body 311, and a hinge portion 315 disposed at the other end of the rod body 311. The sleeve portion 313 of the support rod 31 of the second support assembly 30 is rotatably connected with the sleeve portion 113 of the support rod 11 of the first support assembly 10 by means of the angle adjusting assembly 50. The sleeve portion 313 includes a sleeve pipe 3131 and defines a sleeving hole 3133 through the sleeve pipe 3131 in a direction perpendicular to the longitudinal axis of the rod body 311. A mounting hole 3135 is defined in one end of the sleeve portion 313 of the support rod 31 and has a diameter larger that of the sleeving hole 3133. The connecting rod 37 includes a cylindrical rod portion 371 and a pivotal ball 373 formed on one end of the rod portion 371 and rotatably hinged to the hinge portion 315 of the support rod 31. An outer threaded portion 372 is formed at the opposite end of the rod portion 371.

Referring to FIG. 2, the angle adjusting assembly 50 includes an adjusting member 51, two adjusting gears 53 and a resilient member 55. The adjusting member 51 is a substantially T-shaped screwed rod, on which the sleeve portions 113, 313 of the first and second support assemblies 10, 30 pivot. The adjusting member 51 includes an adjusting rod 513 and an adjusting cap 511 integrally formed on a first end of the adjusting rod 513. The other end of the adjusting rod 513 defines an outer threaded portion 515 corresponding to the inner threaded portion 1137 of the sleeve portion 113 of first support assembly 10. An adjusting gear 53 is fixedly assembled within the mounting hole 1135 of the first support assembly 10 and an opposite and matching adjusting gear 53 is fixedly assembled within the mounting hole 3135 of the second supporting assembly 30. The two adjusting gears 53 are capable of keeping the first and second support assemblies 10, 30 at a preset angle relative to each other. The two adjusting gears 53 are also capable of being disengaged to allow rotation relative to each other, thereby adjusting the angle between the first support assembly 10 and the second support assembly 30. Thus, the first and second support assemblies 10, 30 are adjustably and rotatably assembled together.

Each adjusting gear 53 is a hollow ring and includes a cylindrical gear body 531 defining an axial through hole 533 therethrough, and a plurality of gear teeth 535 separately formed on the periphery of the gear body 531 to surround the through hole 533 axially. The resilient member 55 also has the shape of a ring, and is sleeved on the adjusting rod 513 of the adjusting member 51. The member 55 is of a small diameter, such that the member 55 may be seated inside the circle formed by the peripheral gear teeth 535, and is sandwiched between the two adjusting gears 53. In the illustrated embodiment, the member 55 is a coil spring or an elastic washer.

The adjusting board 70 is substantially a stepped disk mounted to the distal end of the second support assembly 30. The adjusting board 70 includes a cylindrical base portion 71 and a cylindrical protrusion 73 coaxially formed on the base portion 71. In the illustrated embodiment, a plurality of connecting holes 711 are separately defined through the base portion 71 and positioned adjacent to the periphery of the base portion 71 to surround the protrusion 73. An axial screw hole 713 is defined through the central portion of the base portion 71 and the protrusion 73, for connecting with the second support assembly 30.

The plurality of elastic members 80 are coil springs, each member 80 is fat in the middle and thin at the ends. In the illustrated embodiment, there are four elastic members 80.

The fixed bracket 90 includes a base body 91 and a plurality of holding arms 93 radiating out from the base body 91. The distal end of each holding arm 93 is bent forwards, thereby forming a substantially arc-shaped bent portion 931. The plurality of holding arms 93 and the base body 91 cooperatively define a holding space (not figured) for receiving and holding the electronic device 200 (shown in FIG. 1). In the illustrated embodiment, there are four holding arms 93 symmetrically extending out from the periphery of the base body 91. A fixing hook 97 is formed on the back surface of each holding arm 93, away from the holding space of the fixed bracket 90, and in close proximity to an arc-shaped bent portion 93.

When assembling the support device 100, an adjusting gear 53 is fixed within the mounting hole 1135 of the first support assembly 10, and the second adjusting gear 53 is fixed within the mounting hole 3135 of the second supporting assembly 30. The adjusting member 51 of the angle adjusting assembly 50 is passed through the sleeving hole 3133 of the second support assembly 30, the resilient member 55 and the sleeving hole 1133 of the first support assembly 10, in that order, thereby rotatably connecting the first and second support assemblies 10, 30 together. The two adjusting gears 53 engage with each other. The outer threaded portion 515 of the adjusting member 51 engages with the inner threaded portion 1137 of the sleeve portion 113 of first support assembly 10. The adjusting board 70 is fixedly assembled to the rod portion 371 of the second support assembly 30, and the outer threaded portion 372 of the rod portion 371 engages into the screwed hole 713 of the adjusting board 70. Finally, the fixed bracket 90 is elastically mounted to the adjusting board 70 by means of the plurality of elastic members 80. Each elastic member 80 is latched into a connecting hole 711 of the adjusting board 70 and the other end is fixed to a fixing hook 97 of the fixed bracket 90, to finish the assembly of the support device 100.

In use, the electronic device 200 is mounted to the fixed bracket 90 and held by the holding arms 93 of the fixed bracket 90. When adjustment of the angle between the first and second support assemblies 10, 30 is required, the outer threaded portion 515 of the adjusting member 51 is disengaged from the inner threaded portion 1137 of the sleeve portion 113 of first support assembly 10, thereby releasing the resilient member 55 from compression, and thus, the two adjusting gears 53 disengage and can be repositioned before re-engagement. The first and second support assemblies 10, 30 can be rotated to preset the angle therebetween. Finally, the adjusting member 51 is rotated with the outer threaded portion 515 thereof engaging into the inner threaded portion 1137 of the sleeve portion 113 of first support assembly 10 to lock the first and second support assemblies 10, 30 together in the required position.

The support device 100 has a simple structure and is easily operated. The angle between the first support assembly 10 and the second support assembly 30 can be adjusted to obtain a perfect viewing angle of the electronic device 200. In addition, since the fixed bracket 90 is elastically mounted to the adjusting board 70 by means of the plurality of elastic members 80, the electronic device 200 held by the fixed bracket 90 can act as its own shock absorber against the shocks and movements of travelling.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A support device for supporting and holding an electronic device, comprising:
   a first support assembly;
   a second support assembly rotatably and adjustably hinged with the first support assembly, each of the first and second support assemblies defining a sleeving hole, the first support assembly defining an inner threaded portion within the sleeving hole of the first support assembly;
   an adjusting board mounted to a distal end of the first support assembly;
   a plurality of elastic members;
   a fixed bracket elastically mounted to the adjusting board by means of the plurality of elastic members, the fixed bracket comprising a base body and a plurality of holding arms extending out from a periphery of the base body, the plurality of holding arms and the base body cooperatively defining a holding space for holding the electronic device; and
   an angle adjusting assembly, the first and second support assemblies, rotatably and adjustably connected together by means of the angle adjusting assembly, wherein the angle adjusting assembly comprises an adjusting member, two adjusting gears, and a resilient member; the two adjusting gears are assembled within the first and second support assemblies, respectively, and meshing with each other; the adjusting member comprises an adjusting rod and an adjusting cap integrally formed on one end of the adjusting rod, the adjusting rod of the adjusting member passes through the sleeving hole of the first support assembly; the resilient member is sleeved on the adjusting rod and sandwiched between the two adjusting gears, and the distal end of the adjusting rod defines an outer threaded portion for engaging with the corresponding to the inner threaded portion of the first support assembly.

2. The support device of claim 1, wherein the adjusting board defines a plurality of connecting holes through a periphery thereof, each holding arm forms a fixing hook on a back surface thereof away from the holding space of the fixed bracket; opposite ends of each elastic member are connected to a corresponding one of the connecting holes of the adjusting board and a corresponding one of the fixing hooks of the fixed bracket, respectively.

3. The support device of claim 2, wherein the distal end of each holding arm is bent thereby forming a substantially arc-shaped bent portion.

4. The support device of claim 2, wherein the first support assembly comprises a support rod and a connecting rod rotatably hinged to a base end of the support rod, the connecting rod is fixed with the adjusting board.

5. The support device of claim 4, wherein the support rod comprises a rod body and a hinge portion disposed at one end of the rod body, the connecting rod comprises a cylindrical rod portion and a pivotal ball formed on one end of the rod portion and pivotally hinged to the hinge portion of the support rod.

6. The support device of claim 1, wherein, each of the first and second support assemblies comprises a sleeve portion, the sleeve portion comprises a sleeve pipe defining a mounting hole positioned at one end of the sleeve portion; the sleeving holes are defined in the sleeve pipe of the first and second support assemblies, respectively, the two adjusting gears are assembled within the mounting holes of the two support assemblies, respectively, and engage with each other; the adjusting rod of the adjusting member passes through the sleeving hole of the sleeve portion of the first support assembly, the two adjusting gears and the sleeving hole of the sleeve portion of the second support assembly thereby adjustably and rotatably assembling the first and second support assemblies together.

7. A support device for supporting and holding an electronic device, comprising:
   a first support assembly;
   a second support assembly rotatably and adjustably hinged with the first support assembly, each of the first and second support assemblies comprising a sleeve portion, the sleeve portion comprising a sleeve pipe defining a sleeving hole and a mounting hole positioned at a first end of the sleeve portion, the other end of the sleeve portion of the first support assembly defining an inner threaded portion within the sleeving hole thereof;
   an adjusting board mounted to a distal end of the first support assembly;
   a plurality of elastic members;
   a fixed bracket elastically mounted to the adjusting board by means of the plurality of elastic members, the fixed bracket comprising a base body and a plurality of holding arms extending out from a periphery of the base body, the plurality of holding arms and the base body cooperatively defining a holding space for holding the electronic device; and
   an angle adjusting assembly, the first and second support assemblies rotatably and adjustably connected together by means of the angle adjusting assembly, wherein the angle adjusting assembly comprises an adjusting member, two adjusting gears, and a resilient member, the two adjusting gears assembled within the mounting holes of the first and second support assemblies, respectively, and engaging with each other; the adjusting member passes through the sleeving hole of the sleeve portion of first support assembly, the two adjusting gears and the sleeving hole of the sleeve portion of the second support assembly thereby adjustably and rotatably assembling the first and second support assemblies together, the resilient member is sleeved on the adjusting member and sandwiched between the two adjusting gears, the adjusting member comprises an adjusting rod and an adjusting cap integrally formed on one end of the adjusting rod, the distal end of the adjusting rod defines an outer threaded portion for engaging with the corresponding to the inner threaded portion of the first support assembly.

8. The support device of claim 7, wherein the adjusting board defines a plurality of connecting holes through a periphery thereof, each holding arm forms a fixing hook on a back surface thereof away from the holding space of the fixed bracket; opposite ends of each elastic member are connected to a corresponding one of the connecting holes of the adjusting board and a corresponding one of the fixing hooks of the fixed bracket, respectively.

9. The support device of claim 8, wherein the distal end of each holding arm is bent thereby forming a substantially arc-shaped bent portion.

\* \* \* \* \*